United States Patent
Branchut et al.

(10) Patent No.: US 8,256,993 B2
(45) Date of Patent: Sep. 4, 2012

(54) HYBRID RISER TOWERS AND FABRICATION THEREOF

(75) Inventors: Jean-Pierre Branchut, Houston, TX (US); Michael Middel, Cypress, TX (US)

(73) Assignee: Subsea 7 (COM) Inc., Houston, TX (US)

( * ) Notice: Subject to any disclaimer, the term of this patent is extended or adjusted under 35 U.S.C. 154(b) by 0 days.

(21) Appl. No.: 13/129,084

(22) PCT Filed: Nov. 11, 2009

(86) PCT No.: PCT/GB2009/051515
§ 371 (c)(1),
(2), (4) Date: Jul. 26, 2011

(87) PCT Pub. No.: WO2010/055335
PCT Pub. Date: May 20, 2010

(65) Prior Publication Data
US 2011/0280667 A1    Nov. 17, 2011

Related U.S. Application Data

(60) Provisional application No. 61/114,141, filed on Nov. 13, 2008.

(30) Foreign Application Priority Data

Jan. 7, 2009    (GB) .................................. 0900097.7

(51) Int. Cl.
*E21B 17/01* (2006.01)
(52) U.S. Cl. ..................... 405/224.2; 405/211; 405/216; 166/350; 166/367

(58) Field of Classification Search ................. 405/211, 405/211.1, 216, 223.1, 224, 224.2, 224.3, 405/224.4; 166/350, 367
See application file for complete search history.

(56) References Cited

U.S. PATENT DOCUMENTS

| | | | |
|---|---|---|---|
| 4,474,129 A * | 10/1984 | Watkins et al. ............... | 405/211 |
| 6,347,911 B1 * | 2/2002 | Blair et al. ................. | 405/211.1 |
| 6,551,029 B2 * | 4/2003 | Shu et al. ..................... | 405/211 |
| 6,561,734 B1 | 5/2003 | Allen et al. | |
| 6,619,887 B1 | 9/2003 | Szewczyk et al. | |
| 6,685,394 B1 | 2/2004 | Allen et al. | |
| 6,702,026 B2 | 3/2004 | Allen et al. | |
| 6,896,447 B1 * | 5/2005 | Taquino ........................ | 405/211 |
| 6,948,884 B2 * | 9/2005 | Xu et al. ....................... | 405/211 |
| 7,070,361 B2 * | 7/2006 | McMillan et al. ............. | 405/211 |
| 7,100,694 B2 * | 9/2006 | Legras et al. ................. | 166/350 |
| 7,108,457 B1 * | 9/2006 | Brown et al. ................. | 405/211 |
| 7,406,923 B2 | 8/2008 | Allen et al. | |
| 2002/0168232 A1 * | 11/2002 | Xu et al. ...................... | 405/224 |
| 2004/0074648 A1 * | 4/2004 | Legras et al. ................. | 166/367 |

(Continued)

FOREIGN PATENT DOCUMENTS

GB    2378969    2/2003
(Continued)

*Primary Examiner* — Frederick L Lagman
(74) *Attorney, Agent, or Firm* — Levy & Grandinetti

(57) ABSTRACT

Disclosed is a riser tower structure including a plurality of elongate objects. The riser tower structure is provided with blocks, preferably of buoyant material, along at least part of its length. The blocks provide the riser tower with a substantially circular cross-sectional profile, wherein one or more strakes are provided on the outside of the blocks. The strakes in a main embodiment are helical. Also disclosed is a corresponding method of constructing such a riser tower structure.

22 Claims, 4 Drawing Sheets

U.S. PATENT DOCUMENTS

| | | |
|---|---|---|
| 2004/0076478 A1* | 4/2004 | Legras et al. ............. 405/224.2 |
| 2004/0175240 A1* | 9/2004 | McMillan et al. ............ 405/211 |
| 2005/0232703 A1* | 10/2005 | Saint-Marcoux .......... 405/154.1 |
| 2007/0196181 A1* | 8/2007 | Tyrer et al. ................. 405/224.2 |
| 2007/0215028 A1* | 9/2007 | Lie ............................... 405/211 |
| 2007/0231077 A1* | 10/2007 | Burgess ....................... 405/216 |
| 2008/0050181 A1* | 2/2008 | Masters et al. ............... 405/211 |
| 2008/0236469 A1* | 10/2008 | Masters et al. ............... 114/243 |
| 2009/0185867 A1* | 7/2009 | Masters et al. ............... 405/216 |
| 2009/0185868 A1* | 7/2009 | Masters et al. ............... 405/216 |

FOREIGN PATENT DOCUMENTS

| | | |
|---|---|---|
| WO | WO 98/29298 | 7/1998 |
| WO | WO 02/063128 | 8/2002 |
| WO | WO 2006/127718 | 11/2006 |
| WO | WO 2007/149770 | 12/2007 |
| WO | WO 2008/056185 | 5/2008 |

* cited by examiner

HYBRID RISER TOWERS AND FABRICATION THEREOF

This Application is the U.S. National Phase of International Number PCT/GB2009/051515 filed on Nov. 11, 2009, which claims priority to Great Britain Application Number 0900097.7 filed on Jan. 7, 2009, and U.S. Provisional Application No. 61/114,141 filed on Nov. 13, 2008.

The present invention relates to Hybrid Riser Towers, and in particular to reduction of the problem of vortex induced vibration on Hybrid Riser Tower structures.

Hybrid Riser Towers are known and form part of the so-called hybrid riser, having an upper portions ("jumpers") made of flexible conduit and suitable for deep and ultra-deep water field development. U.S. Pat. No. 6,082,391 (Stolt/Doris) proposes a particular Hybrid Riser Tower (HRT) consisting of an empty central core, supporting a bundle of (usually rigid) riser pipes, some used for oil production some used for injection of water, gas and/or other fluids, some others for oil and gas export. This type of tower has been developed and deployed for example in the Girassol field off Angola. Insulating material in the form of syntactic foam blocks surrounds the central core and the pipes and separates the hot and cold fluid conduits. Further background has been published in paper "Hybrid Riser Tower: from Functional Specification to Cost per Unit Length" by J-F Saint-Marcoux and M Rochereau, DOT XIII Rio de Janeiro, 18 Oct. 2001. New versions of such risers have been proposed in WO 02/053869 A1. The contents of all these documents are incorporated herein by reference, as background to the present disclosure.

The phenomenon of Vortex-induced vibrations (VIV) is a known problem for HRTs, and indeed for offshore oil exploration and production risers in general. VIV are motions induced on bodies, such as an installed riser, facing an external flow by periodical irregularities on this flow. As a result of these periodical irregularities and the slowing of the flow around the riser, vortices are formed. These vortices change the pressure distribution along the riser surface and when not formed symmetrically around the riser cause different lift forces to develop on each side of the riser, thus leading to motion transverse to the flow. VIV is an important source of fatigue damage to risers. These elongate slender structures experience both current flow and top-end vessel motions, which give rise to the flow-structure relative motion and cause VIV. The top-end vessel motion causes the riser to oscillate and the corresponding flow profile appears unsteady.

It is known to equip individual risers with strakes, or other protrusions, to disrupt the cylindrical profile and reduce VIV. Difficulties arise, however, when addressing the problem of VIV for a bundle of risers such as required for a HRT, as current fabrication does not make allowance for the fitting of said strakes.

Consequently, it is an aim of the invention to address some or all of the above mentioned issues.

In a first aspect of the invention there is provided a riser tower structure of a type comprising a plurality of elongate objects, said riser tower structure being provided with blocks along at least part of its length, said blocks providing said riser tower with a substantially circular cross-sectional profile, wherein one or more strakes are provided on the outside of said blocks.

Said strakes may be helical in shape. More than one strake may be provided on a single block, circumferentially offset from one another.

Said blocks may comprise insulation and/or buoyancy modules. They may be formed out of a plurality of parts. In one embodiment said blocks may comprise a plurality of main sections, preferably two, which are attached together around one of said elongate elements, forming a channel therefor. Said main parts may further comprise recesses, around their periphery and along their length for the location of the remaining of said plurality of elongate objects, said blocks further comprising closing pieces to retain said elongate objects when in place.

Said blocks (when assembled together if necessary) may be provided with one or more inserts, each for the location therein of said one or more strakes. Said insert may follow the intended footprint of its corresponding strake.

Said strakes may be made of the same material than said blocks.

One of said elongate objects may comprise a central core. Said plurality of elongate objects may comprise a plurality of conduits arranged around the central core. Additionally, other elongate objects may make up the riser, such as umbilical and control lines. Said riser tower structure may comprise said blocks along the majority of the riser length. Said riser tower may comprise guide frames along its length, to guide the risers. Said blocks may be provided between successive guide frames.

In a further aspect of the invention there may be provided a method of constructing a riser tower structure comprising:
  attaching blocks around a central core of a riser tower structure, said blocks being provided with recesses, around their periphery and along their length.
  locating conduits and/or other elongate objects in said recesses;
  closing said recesses with a closing piece, thus providing said riser tower structure with a substantially circular cross sectional profile along its length; and
  attaching at least one strake to the outside of said riser tower structure.

Said riser tower structure maybe any one of those described with the first aspect of the invention.

Said riser tower is preferably fabricated in sections, each of said sections being fabricated according to the first aspect of the invention and then assembled together. Each section may be greater than 100 meters long, and may lie between 100 meters and 300 meters in length. In a main embodiment they will be between approximately 150 and 200 meters.

Said strake may be attached to the blocks. Said method may comprise the providing of an insert for each strake during fabrication of said blocks.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
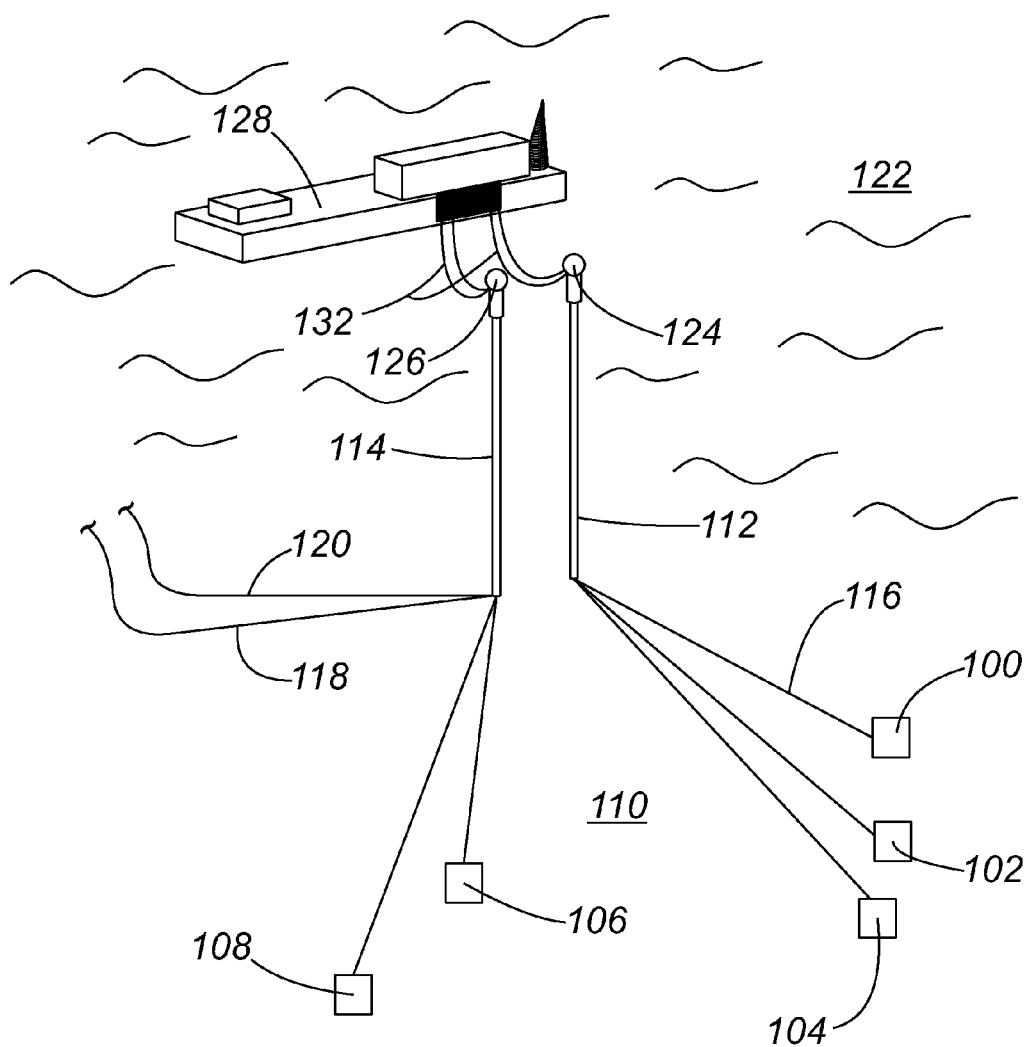
FIG. 1 shows a known type of hybrid riser structure in an offshore oil production system.

Referring to FIG. 1, the person skilled in the art will recognise a cut-away view of a seabed installation comprising a number of well heads, manifolds and other pipeline equipment 100 to 108. These are located in an oil field on the seabed 110.

Vertical riser towers are provided at 112 and 114, for conveying production fluids to the surface, and for conveying lifting gas, injection water and treatment chemicals such as methanol from the surface to the seabed. The foot of each riser, 112, 114, is connected to a number of well heads/injection sites 100 to 108 by horizontal pipelines 116 etc.

Further pipelines 118, 120 may link to other well sites at a remote part of the seabed. At the sea surface 122, the top of each riser tower is supported by a buoy 124, 126. These towers are pre-fabricated at shore facilities, towed to their operating location and then installed to the seabed with anchors at the bottom and buoyancy at the top.

A floating production unit (FPU) 128 is moored by means not shown, or otherwise held in place at the surface. FPU 128 provides production facilities, storage and accommodation for the fluids from and to the wells 100 to 108. FPU 128 is connected to the risers by flexible flow lines 132 etc arranged in a catenary configuration, for the transfer of fluids between the FPU and the seabed, via riser towers 112 and 114.

Individual pipelines may be required not only for hydrocarbons produced from the seabed wells, but also for various auxiliary fluids, which assist in the production and/or maintenance of the seabed installation. For the sake of convenience, a number of pipelines carrying either the same or a number of different types of fluid are grouped in "bundles", and the riser towers 112, and 114 in this embodiment comprise each one a bundle of conduits for production fluids, lifting gas, water and gas injection, oil and gas export, and treatment chemicals, e.g. methanol. All the component conduits of each bundle are arranged around a central core, and are held in place relative to each other (in the two lateral dimensions, longitudinal movement not being prevented) by guide frames attached to the central core.

Figure 2:
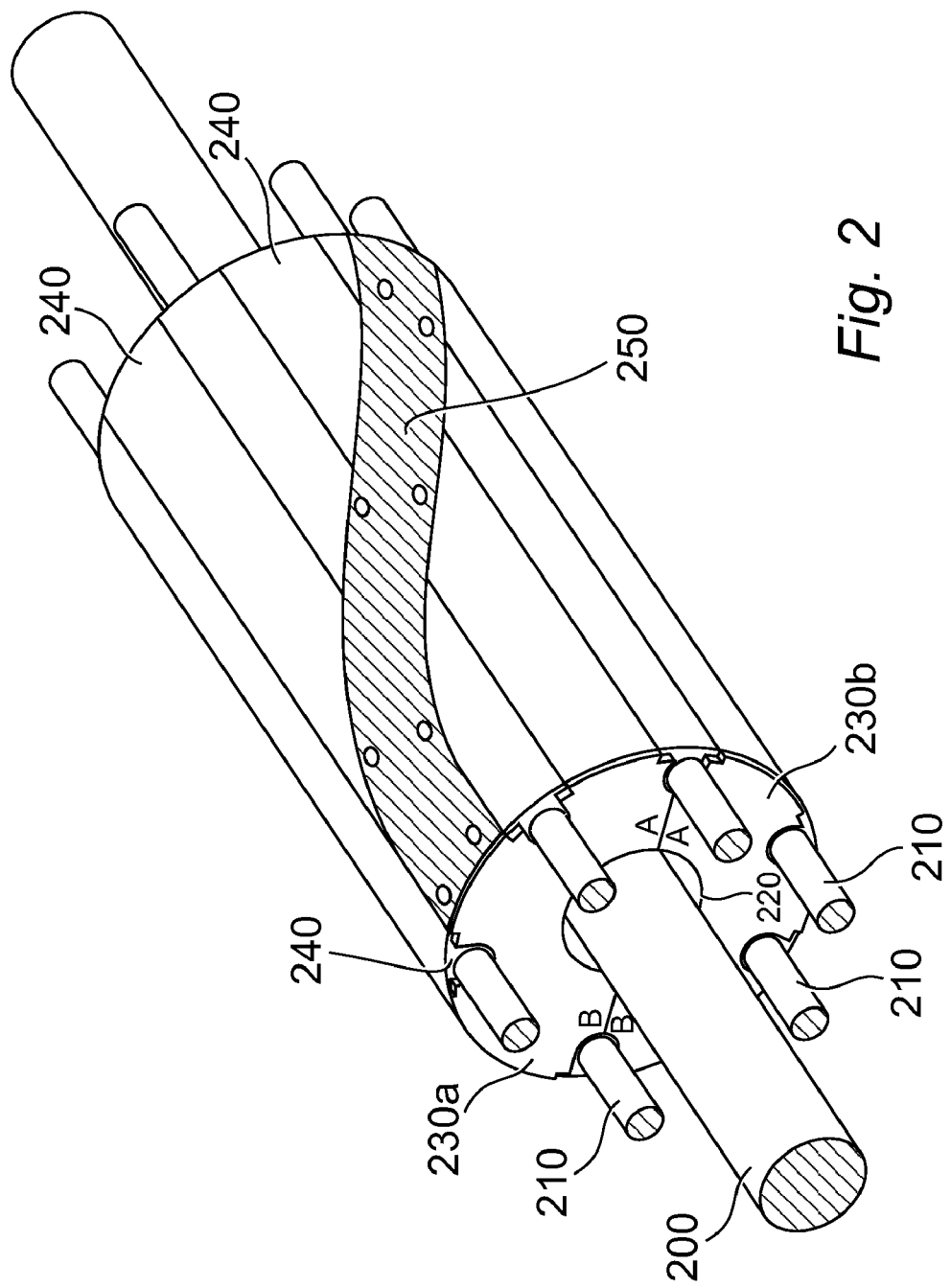
FIG. 2 shows a riser bundle having buoyancy blocks adapted for the addition of strakes.

FIG. 2 shows a part of a riser bundle having buoyancy blocks adapted for the addition of strakes to counteract the issue of vortex induced vibration (VIV). Shown is a central core 200, which may or may not double as a fluid conduit with riser conduits (or umbilicals etc.) 210 arranged therearound. Buoyancy blocks, formed in two halves 230a, 230b are assembled (possibly bolted together) around the core pipe 200, said blocks forming a channel 220 for said core 210. Said blocks may be specifically designed to be within the outside diameter of the riser tower.

Recesses are formed in the periphery of the buoyancy blocks 230a, 230b, each for the locating therein of the individual riser conduits 210 (in this example; in other embodiments, recesses may be shared by more than one conduit or umbilical etc.). Closing gates 240 are provided to form closed channels for each riser conduit 210, while providing the structure with a largely unbroken cylindrical cross section (these may be bolted, or bonded in place with adhesive, or both). These gates 240 may be made from the same material as the buoyancy blocks 230a, 230b. Both the central core 200 and risers 210 are loose inside their channels, with the buoyancy force imparted onto the central core via guide frames (not shown) located at various points along the riser bundle.

A strake insert 250 is provided onto each of said riser buoyancy blocks 230 during their fabrication. A template may have been used to ensure perfect match with the strake to be inserted therein. The two buoyancy block halves 230a, 230b should be correctly paired together during installation, which ensures continuity of the strake insert 250.

Figure 3:
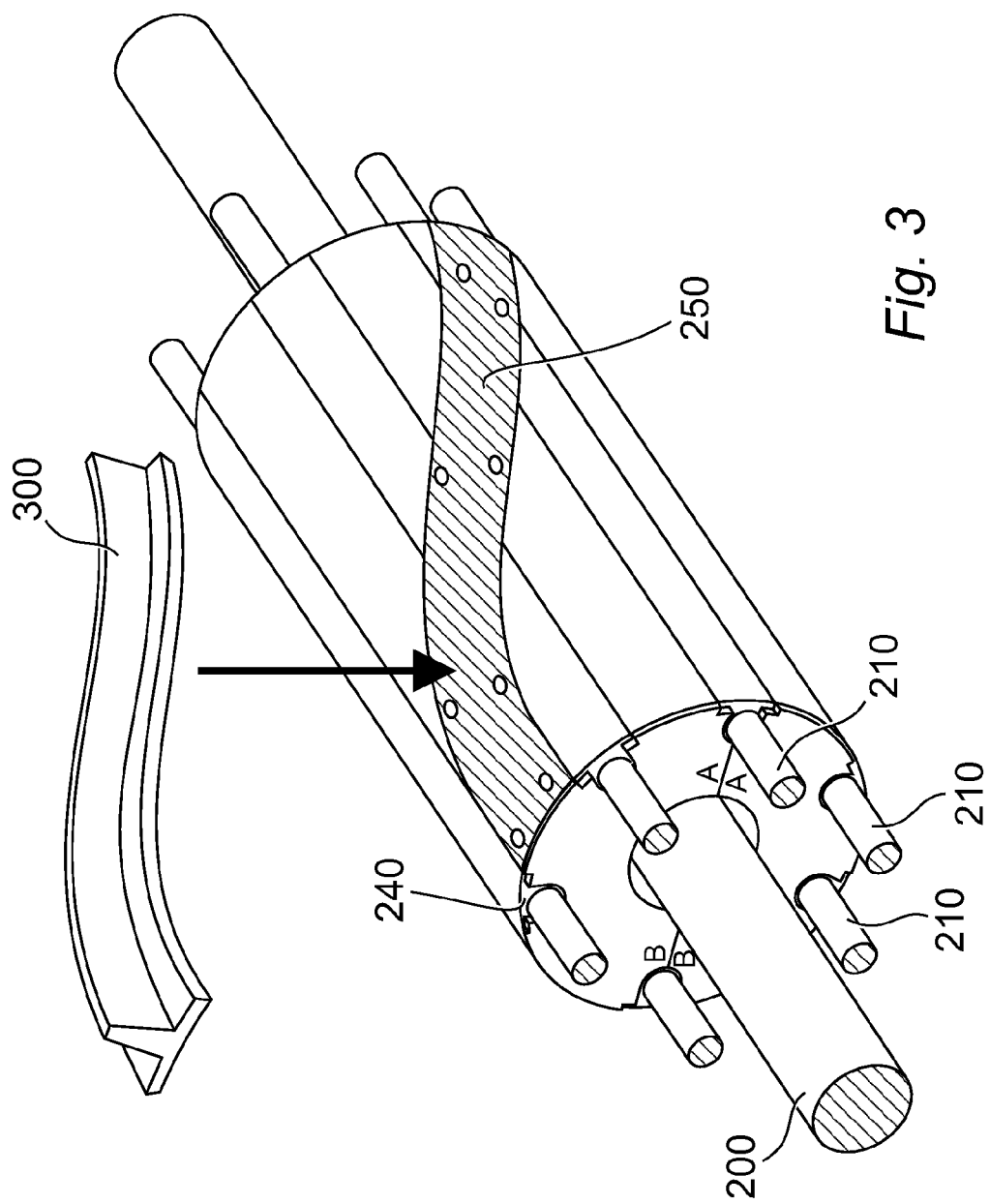
FIG. 3 shows the riser bundle of FIG. 2, with strake ready for attachment.

FIG. 3 shows the assembled riser bundle of FIG. 2 with strake 300 shown, ready to be attached. In an embodiment, the strake is made from the same material as the buoyancy blocks 230a, 230b, and is specifically matched to a particular pair of buoyancy blocks 230a, 230b. Said strake should be substantially continuous and allow no, or minimal water passage between it and the buoyancy block.

Figure 4:
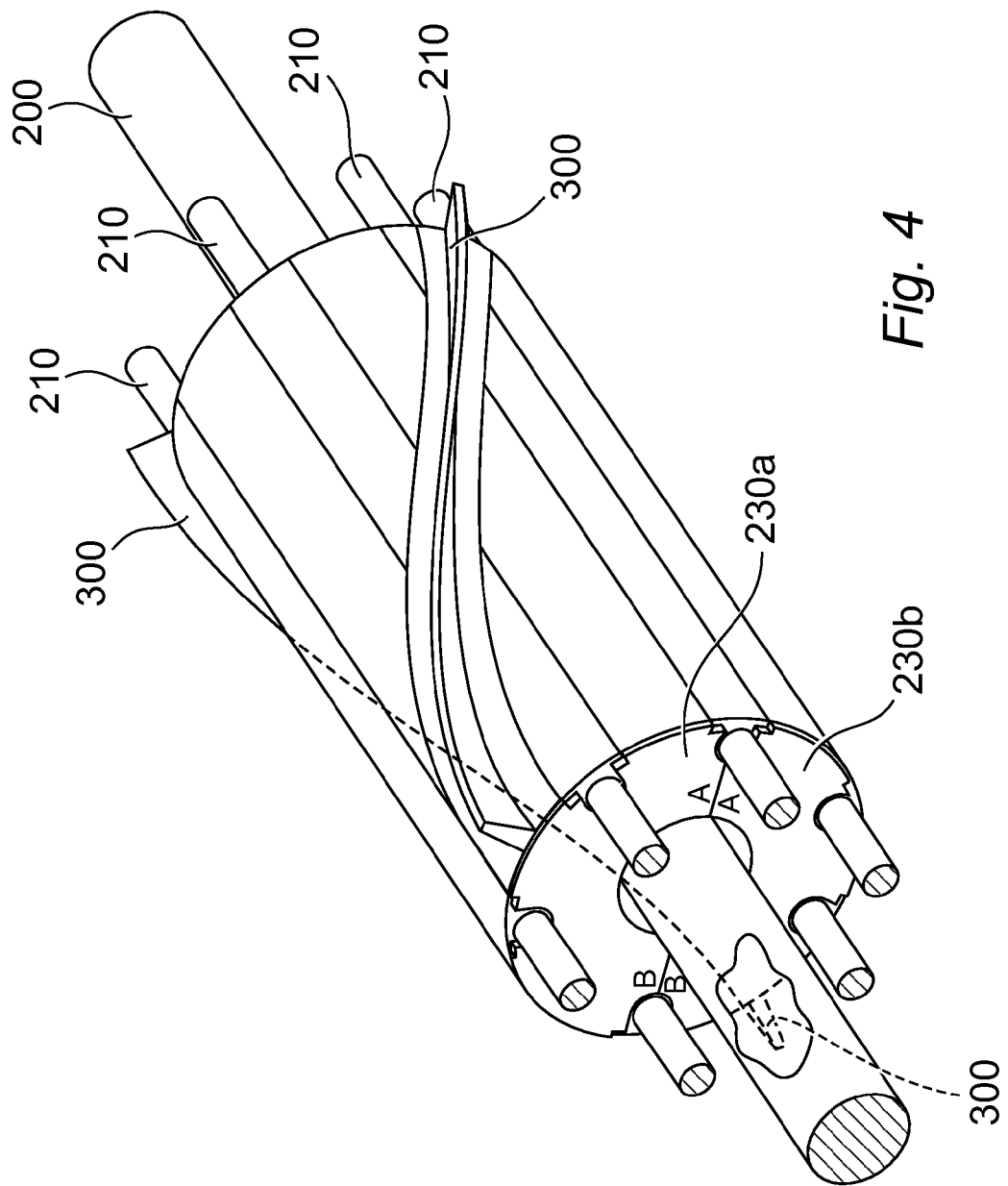
FIG. 4 shows the riser bundle of FIG. 2 with two strakes attached.

FIG. 4 shows the assembled riser bundle with two strakes 300 attached, circumferentially offset from one another, one of said strakes in place in said insert 250. Of course, the other strake 300 will have its own corresponding insert 250. The strakes may be bolted in place, and/or bonded with adhesive. The inserts 250 may therefore be provided with threads to receive the bolts.

There are a number of advantages of this arrangement over the fabrication of steel strakes attached onto the guiding frames. These would be both heavier and less efficient, as there would be a gap between the strake and buoyancy block. Furthermore, the above embodiment allows for efficient fabrication and assembly. Essentially the foam blocks (with inserts for the strakes), closing gates and strakes can be fabricated at the same time from the same material. Each set of the above should be identified to go together and not be mixed.

Consequently the installation of the strakes can become a standard procedure, to take place once the buoyancy blocks and closing gates have been assembled to the riser bundle.

The above embodiments are for illustration only and other embodiments and variations are possible and envisaged without departing from the spirit and scope of the invention. For example, the riser arrangements depicted are simply for illustration and may be varied, and in particular the number of strakes may be varied. Strakes do not necessarily have to be helical in shape.

The invention claimed is:

1. A riser tower structure comprising a plurality of elongate conduits arranged around a central core, and being provided with buoyancy and/or insulation blocks along at least part of its length, the buoyancy and/or insulation blocks being formed out of a plurality of main sections, which are attached together around the central core, to form a channel therefor and provide the riser tower structure with a substantially circular cross-sectional profile, wherein the main sections further comprise recesses around their periphery and along their length for the location of the elongate conduits, said blocks further comprising closing pieces for each recess to retain said elongate conduits when in place and thereby providing the riser tower structure with a substantially unbroken cylindrical cross section, and wherein one or more strakes are provided on the outside of said blocks.

2. A riser tower structure according to claim 1 wherein said strakes are helical in shape.

3. A riser tower structure according to claim 1 wherein more than one strake is provided on a single block, each circumferentially offset from one another.

4. A riser tower structure according to claim 1, wherein said blocks each comprise two main sections.

5. A riser tower structure according to claim 1 wherein said blocks are provided with one or more inserts, each for the location therein of said one or more strakes.

6. A riser tower structure according to claim 5 wherein said insert follows the intended footprint of its corresponding strake.

7. A riser tower structure according to claim 1 wherein said strakes are made of the same material as said blocks.

8. A riser tower structure according to claim 1 wherein in addition to said conduits, said elongate objects also include umbilical and/or control lines.

9. A riser tower structure according to claim 1 wherein said riser tower structure comprises said blocks along the majority of the riser tower structure length.

10. A riser tower structure according to claim 1, wherein said closing pieces are adapted to close said recesses but not otherwise to extend along the outside of the blocks.

11. A riser tower structure according to claim 10, wherein said strakes are helical in shape, and wherein at least one of said strakes extends across at least one of the closing pieces.

12. A riser structure according to claim 10, wherein said strakes are helical in shape, and wherein along a length of a block, each strake provides less than one full rotation.

13. A riser tower structure according to claim 10, wherein said strakes are helical in shape, and wherein at least one of said strakes extends across at least one of the closing pieces.

14. A riser tower structure according to claim 1, wherein said closing pieces are adapted to close said recesses but not otherwise to extend along the outside of the blocks.

15. A method of constructing a riser tower structure comprising:
  attaching buoyancy and/or insulation blocks around a central core of a riser tower structure, said blocks being provided with recesses, around their periphery and along their length;
  locating conduits and/or other elongate objects in said recesses;
  closing said recesses with a closing piece for each recess, thus providing said riser tower structure with a substantially circular cross sectional profile along its length; and
  attaching at least one strake to the outside of said riser tower structure.

16. A method according to claim 15 wherein said riser tower structure comprises a plurality of elongate conduits arranged around a central core, the riser tower structure being provided with buoyancy and/or insulation blocks along at least part of its length, the buoyancy and/or insulation blocks being formed out of a plurality of main sections, which are attached together around the central core, to form a channel therefor and provide the riser tower structure with a substantially circular cross-sectional profile, wherein the main sections further comprise recesses around their periphery and along their length for the location of the elongate conduits, said blocks further comprising closing pieces to retain said elongate conduits when in place and thereby providing the riser tower structure with a substantially unbroken cylindrical cross section, and wherein one or more strakes are provided on the outside of said blocks.

17. A method according to claim 15 wherein said riser tower structure is fabricated in sections, each of said sections comprising a plurality of elongate conduits arranged around a central core, and being provided with buoyancy and/or insulations blocks along at least part of its length, the buoyancy and/or insulation blocks formed out of a plurality of main sections, where are attached together around the central core, to form a channel therefor and provide the riser tower structure with a substantially circular cross-sectional profile, wherein the main sections further comprise recesses around their periphery and along their length for the location of the elongate conduits, said blocks further comprising closing pieces to retain said elongate conduits when in place and thereby providing the riser tower structure with a substantially unbroken cylindrical cross section, and wherein one or more strakes are provided on the outside of said blocks, wherein the sections are then assembled together.

18. A method according to claim 15 wherein each section is greater than 100 meters long.

19. A method according to claim 18 wherein each section lies between 100 meters and 300 meters in length.

20. A method according to claim 15 wherein each section is between approximately 150 and 200 meters.

21. A method according to claim 15 wherein said strake is attached to the blocks.

22. A method according to claim 15 comprising providing an insert for each strake during fabrication of said blocks.

\* \* \* \* \*

UNITED STATES PATENT AND TRADEMARK OFFICE
CERTIFICATE OF CORRECTION

PATENT NO. : 8,256,993 B2  
APPLICATION NO. : 13/129084  
DATED : September 4, 2012  
INVENTOR(S) : Jean-Pierre Branchut and Michael Middel Page 1 of 1

It is certified that error appears in the above-identified patent and that said Letters Patent is hereby corrected as shown below:

ON THE TITLE PAGE

Item (73) should read:

[73] Assignee: Subsea 7 [[(COM)]] (GOM) Inc., Houston, TX (US)

Signed and Sealed this
Eighteenth Day of June, 2013

Teresa Stanek Rea
*Acting Director of the United States Patent and Trademark Office*